G. MEYER.
APPARATUS FOR JOINING THE MOVABLE PARTS WITH THE STATIONARY PARTS OF STEAM, AIR, OR OTHER CONDUITS, PARTICULARLY OF RAILWAY VEHICLES.
APPLICATION FILED MAR. 18, 1920.
1,356,215. Patented Oct. 19, 1920.
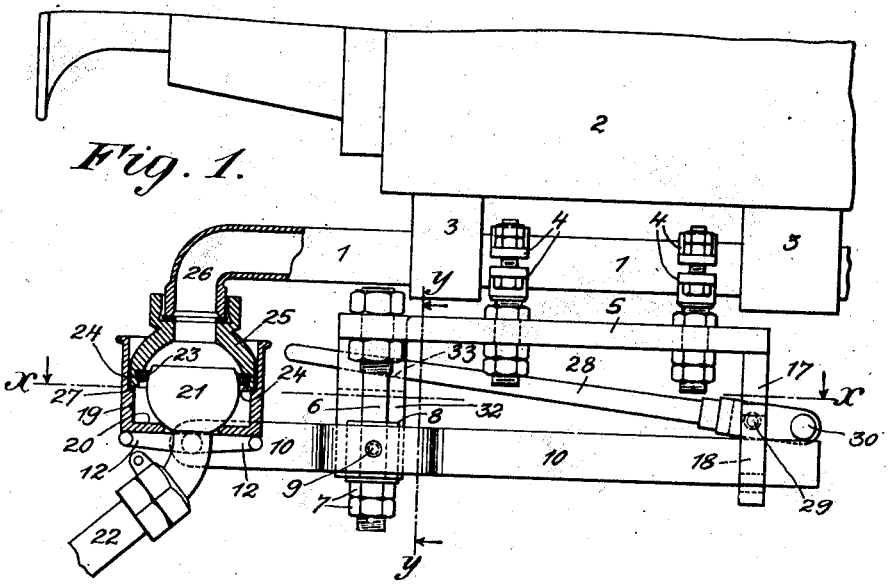
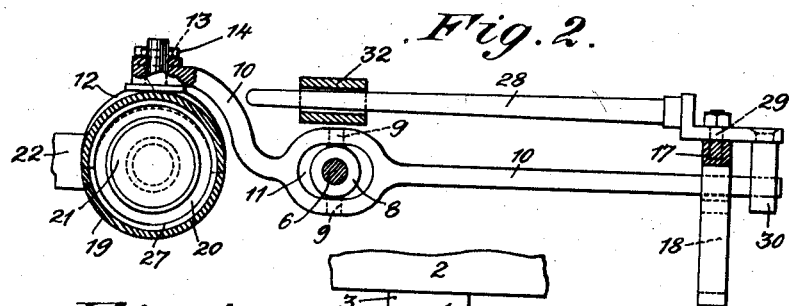
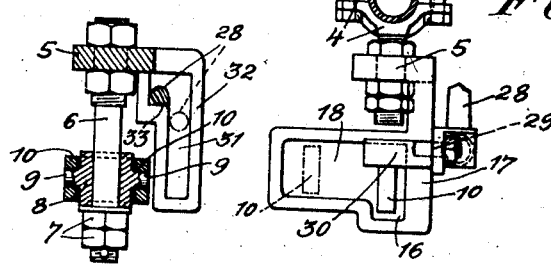

UNITED STATES PATENT OFFICE.

GOTTFRIED MEYER, OF ZURICH, SWITZERLAND.

APPARATUS FOR JOINING THE MOVABLE PARTS WITH THE STATIONARY PARTS OF STEAM, AIR, OR OTHER CONDUITS, PARTICULARLY OF RAILWAY-VEHICLES.

1,356,215.   Specification of Letters Patent.   Patented Oct. 19, 1920.

Application filed March 18, 1920. Serial No. 367,029.

*To all whom it may concern:*

Be it known that I, GOTTFRIED MEYER, a citizen of Switzerland, residing at Grüngasse 11, Zurich, in the Canton of Zurich, Switzerland, have invented certain new and useful Improvements in Apparatus for Joining the Movable Parts with the Stationary Parts of Steam, Air, or other Conduits, Particularly of Railway-Vehicles, of which the following is a specification.

My invention relates to an improvement in apparatus for joining the movable parts with the stationary parts of steam, air or other conduits particularly of railway vehicles.

By the aid of this apparatus, the movable parts of the said conduits may very quickly and without any trouble be connected with and disconnected from the stationary parts of the said conduits, no threads or cams being used therewith and the connection being constantly tight.

The invention consists of an apparatus comprising a lever vertically acting upon the movable conduit part by means of a forked member and capable of being laterally engaged with and disengaged from the movable conduit part to connect and disconnect the said conduit parts and means for pressing upward the fork carrying arm of the said lever.

The accompanying drawings illustrate one form my invention may assume, and in same—

Figure 1 is an elevation, partly in section.

Fig. 2 is a horizontal section on line *x—x* in Fig. 1.

Fig. 3 is an end view from the right in Fig. 1.

Fig. 4 is a vertical section on the line *y—y* in Fig. 1.

Fig. 5 shows parts of the fork and of the main-lever.

The stationary part 1 of the steam or air conduit is fixed to the railway-vehicle 2 by means of sockets 3, and carries by means of clips 4 and threaded bolts a horizontal bar 5 extending in the longitudinal axis of the vehicle 2. On the front part of this bar a vertical supporting bolt 6 is fixed. The lower end portion of this bolt is screw threaded and has nuts 7 upon which rests a sleeve 8 loosely mounted upon the bolt 6 and having two diametrically opposed pivots 9. A lever 10 having a slot 11 and carrying pivotally a fork 12 is fulcrumed on the pivots 9. Thus the lever 10 is capable of a vertical and horizontal movement. The swiveling movement of the fork is limited by a lug 13 of the lever 10 and by a transverse pin 14 inserted in the shank 15 of the fork 12. By this arrangement the fork 12 is caused to occupy always a substantially horizontal position.

The rear arm of the lever 10 is guided in its vertical movement by the vertical slot 16 of a guide 17 pending downward from the bar 5 and having a horizontal slot 18 into which the rear arm of the lever 10 enters when it is raised and moved laterally. The forked member 12 carries a sleeve 19 having a bottom 20 centrally apertured and embracing the spherical head 21 of the movable part of the steam conduit 22. When the fork 12 is raised by means afterward described, the spherical head 21 is pressed against a tightening ring 23 of rubber, leather or other suitable material contained in a dove-tail-shaped circular groove 24 provided in the lower end of a second loose sleeve 25 the upper end of which tightly fits to the lower end of the arc shaped end piece 26 of the stationary part 1 of the steam conduit. A shoulder 27 provided on the inside of the sleeve 19 finally butts on the lower edge of the second sleeve 25 and presses it upward against the end piece 26. Thus the final tightening pressure of the fork 12 is exerted on the second sleeve 25 resting against the arc shaped piece 26 and not on the spherical head 21, so that the same is not prevented from moving on the ring 23, although it tightly fits on this ring. Moreover the pressure of the steam contained in the sleeve 25 presses the ring 23 down in the dove-tail shaped groove 24 and against the head 21, so that no steam may escape between the head and the ring 23 and a great economy of steam is obtained. It is a very well known fact that the usual couplings of steam or air conduits in railway vehicles leak in a comparatively short time, so that a considerable portion of steam or air is wasted.

In order to press upward the front arm of the lever 10 carrying the fork 12, a pressure lever 28 is fulcrumed at 29 to the pending guide 17 and carries a lateral finger 30 overlapping the rear arm of the main lever 10. The front arm of the pressure lever 28 works in the slot 31 of a guide 32 pending downward from the bar 5. The inner wall of the slot 31 has a shoulder 33 at its upper portion. When the front arm of the lever 28 is in its raised position, this arm, due to its spring action, snaps on the said shoulder 33 whereby the lever 28 is arrested in its operative position, in which the rear arm of the main lever 10 is pressed downward and the front arm thereof pressed upward causing a tight coupling of the movable portion of the conduit to the stationary portion. This pressure acts constantly as the front arm of the pressure lever works like a spring.

When it is desired to disconnect the movable part of the conduit from the stationary part, the front arm of the pressure lever 28 is removed from the shoulder 33 and pressed down in the slot 31. The rear arm of the lever 10 is then raised at the level of the horizontal slot 18 of the guide 17 and horizontally moved into this slot, while the other hand holds the sleeves 19, 25, so that they do not drop when the fork 12 is shifted laterally. When the lever 10 is moved into the slot 18, it is freed and the sleeve 19 with the annexed parts lowered and removed.

In a similar manner the apparatus may be applied to an air-conduit of a railway vehicle or to liquid conduits.

It is to be understood that not only the connecting and disconnecting of the movable parts to the stationary part of a steam, air or other conduit especially of a railway vehicle may be very quickly effected, but also the replacing of tightening rings or other parts.

A weight or spring also may be used to press the fork upward.

What I claim is:—

1. An apparatus for joining the movable parts with the stationary parts of the steam, air or other conduits particularly of railway vehicles comprising a lever vertically acting upon the movable conduit part by means of a forked member and capable of being laterally engaged with and disengaged from the movable conduit part, to connect and disconnect the said conduit parts and means for pressing upward the fork carrying arm of the said lever.

2. An apparatus for joining the movable parts with the stationary parts of the steam, air or other conduits particularly of railway vehicles comprising a lever vertically acting upon the movable conduit part by means of a forked member and capable of being laterally engaged with and disengaged from the movable conduit part, to connect and disconnect the said conduit parts, a lever for pressing upward the fork carrying arm of the first cited lever and means for retaining the pressure lever in its operative position.

3. An apparatus for joining the movable parts with the stationary parts of the steam, air or other conduits particularly of railway vehicles comprising a lever vertically acting upon the movable conduit part by means of a forked member and capable of being laterally engaged with and disengaged from the movable conduit part, to connect and disconnect the said conduit parts, a sleeve having a bottom centrally apertured, carried by the forked member and embracing the movable conduit part and means for pressing upward the fork carrying arm of the said lever.

4. An apparatus for joining the movable parts with the stationary parts of the steam, air or other conduits particularly of railway vehicles comprising a lever vertically acting upon the movable conduit part by means of a forked member and capable of being laterally engaged with and disengaged from the movable conduit part, to connect and disconnect the said conduit parts, a stationary guide having a vertical slot to guide the said lever vertically and a horizontal slot to support the lever when disengaged from the movable conduit part and means for pressing upward the fork carrying arm of the said lever.

5. An apparatus for joining the movable parts with the stationary parts of the steam, air or other conduits particularly of railway vehicles comprising a lever vertically acting upon the movable conduit part by means of a forked member and capable of being laterally engaged with and disengaged from the movable conduit part, to connect and disconnect the said conduit parts, a lever for pressing upward the fork carrying arm of the first cited lever and a guide having a shoulder to receive and retain the handled arm in its operative position of the pressure lever, the front arm of the said pressure lever having spring action.

6. An apparatus for joining the movable parts with the stationary parts of the steam, air or other conduits, particularly of railway vehicles comprising a lever vertically acting upon the movable conduit part by means of a forked member and capable of being laterally engaged with and disengaged from the movable conduit part, to connect and disconnect the said conduit parts, means connecting the said forked member with the said lever and permitting a limited swiveling of the forked member and means for pressing upward the fork carrying arm of the said lever.

In testimony whereof I have affixed my signature.

GOTTFRIED MEYER.